(12) United States Patent
Weichselbaum

(10) Patent No.: US 8,298,060 B2
(45) Date of Patent: Oct. 30, 2012

(54) METHOD AND SYSTEM FOR PROVIDING A DIGITAL JIGSAW PUZZLE AND USING THE PUZZLE AS AN ONLINE ADVERTISING VEHICLE

(76) Inventor: Markus Weichselbaum, San Francisco, CA (US)

( * ) Notice: Subject to any disclaimer, the term of this patent is extended or adjusted under 35 U.S.C. 154(b) by 446 days.

(21) Appl. No.: 12/424,098

(22) Filed: Apr. 15, 2009

(65) Prior Publication Data

US 2009/0258687 A1 Oct. 15, 2009

Related U.S. Application Data

(60) Provisional application No. 61/044,993, filed on Apr. 15, 2008.

(51) Int. Cl.
*A63F 9/24* (2006.01)
(52) U.S. Cl. .......................................................... 463/9
(58) Field of Classification Search ................. 463/9, 31
See application file for complete search history.

(56) References Cited

U.S. PATENT DOCUMENTS

| 5,605,332 A * | 2/1997 | Harnett .................... 273/157 R |
| 5,643,084 A * | 7/1997 | Mirsky ............................. 463/9 |
| 6,264,198 B1 * | 7/2001 | Stamper .................... 273/157 R |
| 2003/0045335 A1 * | 3/2003 | Lantz ............................... 463/9 |

FOREIGN PATENT DOCUMENTS

| JP | 2002078959 | 3/2002 |
| JP | 2002319038 A | 10/2002 |
| KR | 20010083483 | 9/2001 |

OTHER PUBLICATIONS

International Search Report PCT/US2009/040725 dated Sep. 30, 2009; pp. 1-3.
Written Opinion PCT/US2009/040725 dated Sep. 30, 2009, pp. 1-4.

* cited by examiner

*Primary Examiner* — Brook Kebede
(74) *Attorney, Agent, or Firm* — Perkins Coie LLP

(57) ABSTRACT

A system and method of providing a digital jigsaw puzzle game is disclosed. The puzzle pieces exhibit game-play characteristics of physical jigsaw puzzle pieces, such as friction, inertia, and angular momentum. The digital jigsaw puzzle may be implemented on a variety of multiple electronic formats including, but not limited to, websites, mobile devices, home computers, handheld gaming devices, and game consoles. Digital jigsaw puzzles can be used as an advertising format where the image of the puzzle is an advertisement.

17 Claims, 8 Drawing Sheets

METHOD AND SYSTEM FOR PROVIDING A DIGITAL JIGSAW PUZZLE AND USING THE PUZZLE AS AN ONLINE ADVERTISING VEHICLE

CROSS REFERENCES

This application claims the benefit of U.S. Provisional Application No. 61/044,993, entitled "A METHOD AND SYSTEM FOR PROVIDING AN ONLINE JIGSAW PUZZLE AND USING THE PUZZLE AS AN ADVERTISING VEHICLE", filed Apr. 15, 2008, and is hereby incorporated by reference.

FIELD OF THE INVENTION

The present invention relates to providing a digital jigsaw puzzle where the puzzle pieces can be moved and rotated, and the digital puzzle pieces exhibit physical characteristics when moved by a player. The digital jigsaw puzzle may also be effectively used online as an advertising vehicle.

BACKGROUND

Any type of picture, such as a photograph or drawing, may be turned into a jigsaw puzzle by physically cutting up the picture into pieces. Typically the puzzle pieces interlock but may assume any shape. A player assembles the individual pieces of the jigsaw puzzle by fitting matching adjacent pieces together, until the entire original picture is re-created.

DETAILED DESCRIPTION OF THE INVENTION

Described in detail below is a method of providing a digital jigsaw puzzle game, where the digital puzzle pieces exhibit game-play characteristics of physical jigsaw puzzle pieces, such as friction, inertia, and angular momentum. The digital jigsaw puzzle may be implemented on a variety of multiple electronic formats including, but not limited to, websites, mobile devices, home computers, handheld gaming devices, and game consoles.

Figure 1A:
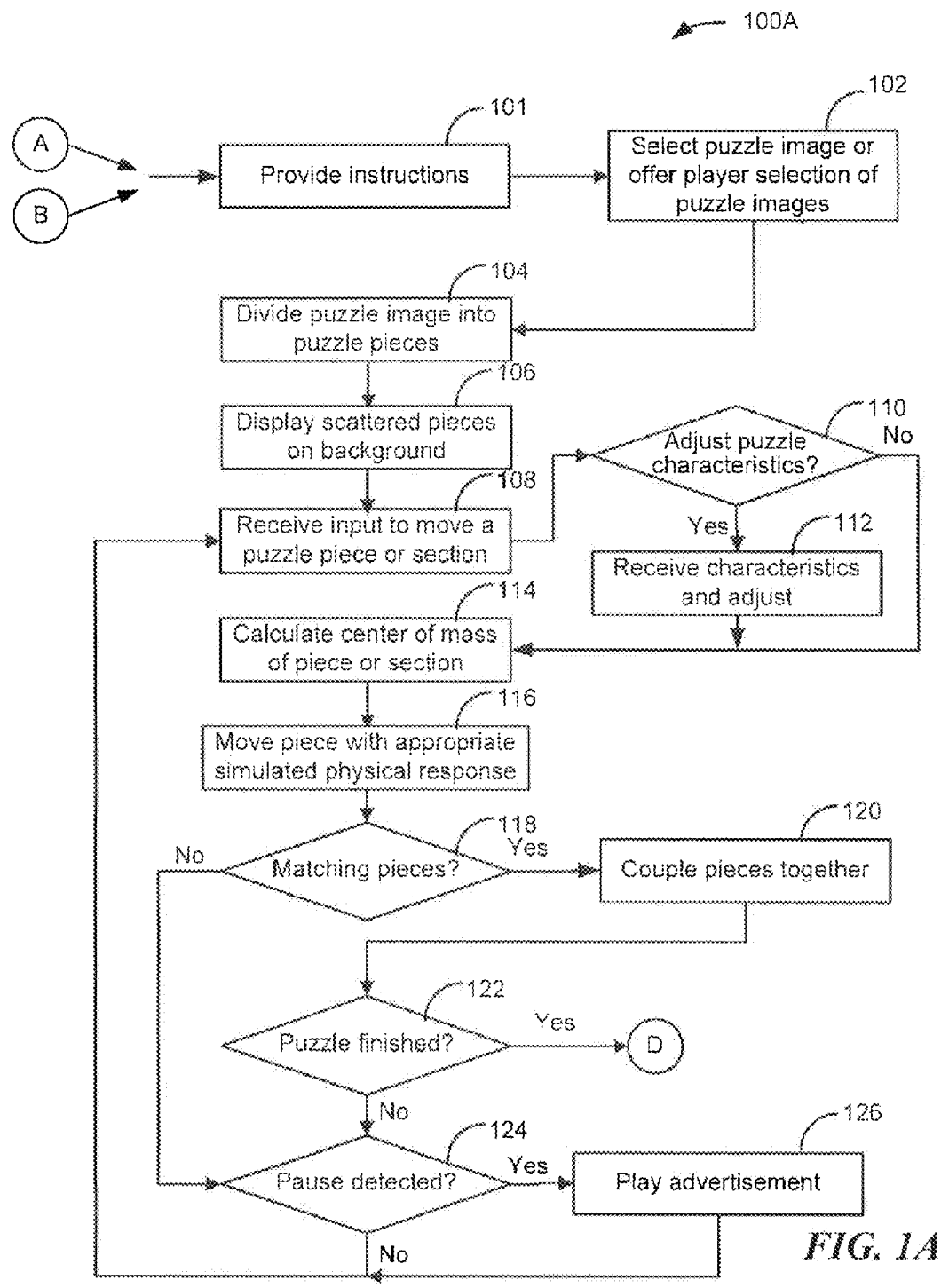
FIG. 1A depicts a flow chart illustrating an example process of providing a digital jigsaw puzzle.

FIG. 1A depicts a flow chart illustrating an example process of providing a digital jigsaw puzzle. At block 101, the system provides instructions to the player. The instructions can include information on the navigational gaming controls, how to select a puzzle image, game-play characteristics of the puzzle pieces and how to adjust the characteristics, and incentives for completing the puzzle, for example, a chance to enter a contest or drawing for a prize.

At block 102, the system selects a puzzle image. In one embodiment, the system can randomly select an image from a library of images for the digital jigsaw puzzle. In one embodiment, a particular advertiser's image can be used. In one embodiment, the system can offer a library of puzzle images to the player and then use a player-selected puzzle image for the current jigsaw puzzle.

Similar to a physical jigsaw puzzle, at block 104 the system divides the digital version of the jigsaw puzzle into pieces. At block 106, the pieces are placed in random locations with random orientations and displayed to the player within a puzzle window. The pieces are placed on a background so that the puzzle pieces may easily be distinguished, and the background may be of a neutral color or contain patterns, logos, watermarks, or advertising.

Figure 2A:
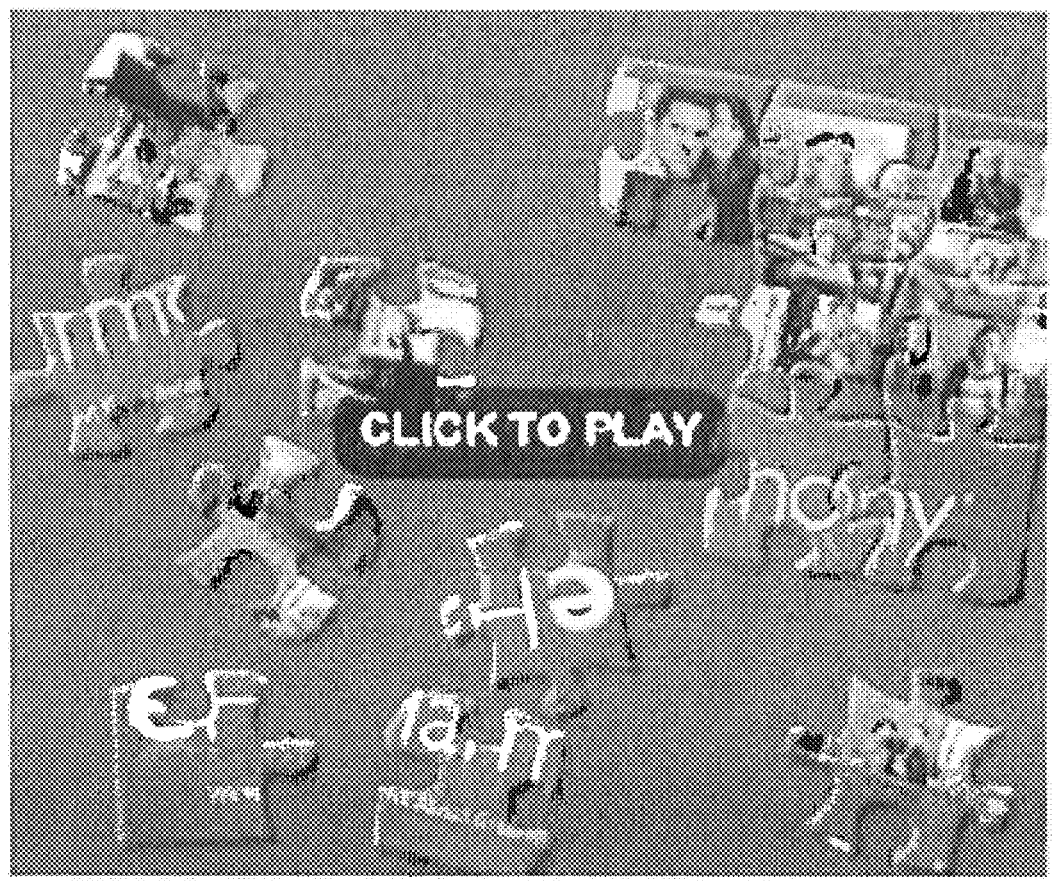
FIG. 2A-2C depict images of online jigsaw puzzles with some of the pieces scrambled.
Figure 2B:
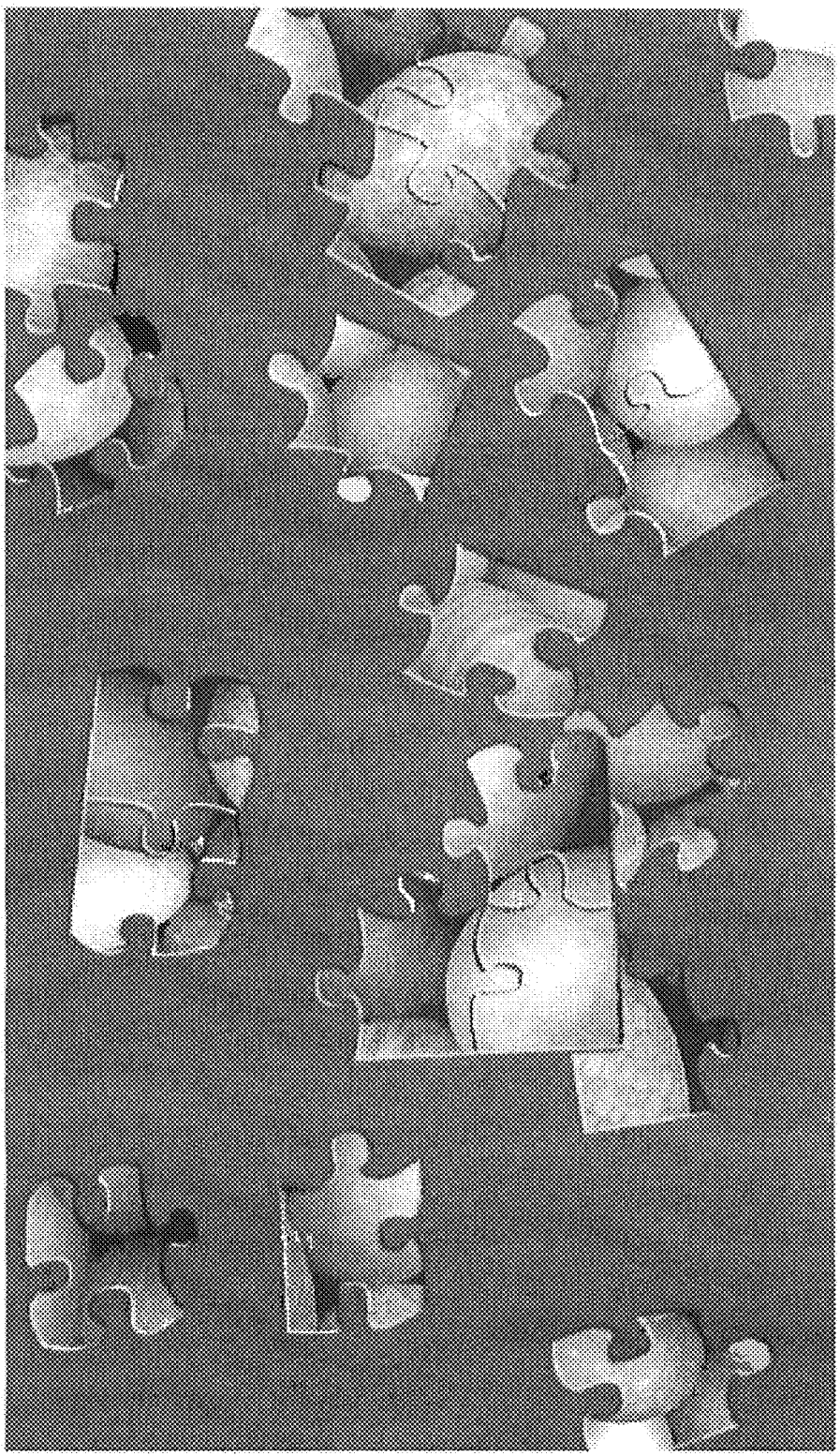
Figure 2C:

FIGS. 2A-2C shows example images 200A, 200B, 200C of jigsaw pieces scattered with random orientations in a game area with a neutral background. Example image 200A in FIG. 2A shows a 300×250 pixel teaser advertisement image that can be placed anywhere on the Internet like a standard advertisement. Example images 200B in FIGS. 2B and 200C in FIG. 2C show partially completed digital jigsaw puzzles. Image 200C includes some text in the image and may be typical for puzzles where the image is an advertisement.

The digital puzzle pieces are rendered using standard lighting techniques so that the pieces exhibit realistic bevels and subtle shadows that mimic the appearance of real jigsaw puzzle pieces having a finite thickness or height. The bevel and shadow effects are applied at a constant angle, independent of a piece's orientation, to simulate a static light source, for example fixed at a 45-degree angle relative to the game play area. The constant illumination angle prevents unnatural looking effects that would otherwise occur were the highlights and shadows to rotate along with a puzzle piece during a rotation.

At block 108, the system receives an input from the player to move a puzzle piece or a section of completed puzzle pieces. When two or more matching pieces are placed in close proximity with the appropriate orientations and characteristics, the puzzle program snaps or connects the pieces together. The player manipulates the individual pieces or sections of completed pieces in the puzzle window through the use of navigational game controls, such as a computer mouse, keyboard, track pad, touch screen, gaming controller or any other computer, mobile phone, handheld gaming, or game console input device to move and assemble the pieces.

A player may move individual puzzle pieces and/or completed sections of the puzzle from one location of the playing area to another by using the gaming navigational controls to click on a piece (for example, with a computer mouse) and drag the piece in any direction to a new location. On devices with keyboards or buttons, pre-selected keys or buttons may be used to move a selected puzzle piece up, down, left, right, or diagonally. Once matching pieces have been snapped together, they remain locked together as a single unit. The pieces may then be moved as a group in a manner similar to moving a single puzzle piece.

As with real puzzle pieces, the digital jigsaw puzzle allows a player to rotate the digital puzzle pieces, both clockwise and counterclockwise. The player first clicks on a piece or a group of pieces to select for rotation. Then by using the gaming navigational controls, the piece responds on the screen to the player's desired movements by rotating in the same direction as the player's movement of the navigational controls. On devices that allow a pointer to be controlled such as a mouse, track pad, touch screen, or motion-sensitive remote controllers, the player may click and drag the pointer on the background near the selected piece in a circular motion, and the piece will respond on the screen by rotating in the same direction as the player's movement of the pointer. Thus, a circular rotational gesture made by the player is converted into a rotational gesture of the selected puzzle piece. Alternatively, on devices with keys or buttons, pre-selected keys or buttons may be used to rotate a selected piece either clockwise or counterclockwise.

More sophisticated puzzle piece responses including, but not limited to, center of mass, angular momentum, friction, and inertia may also be programmed into the digital jigsaw puzzle. The physical characteristics may be predetermined by the implementation of the game but may also be adjustable by the player through methods including, but not limited to, a slider control, a knob control, and numerical value settings. For example, the higher the friction setting, the more drag a puzzle piece exhibits upon movement of the piece by the player.

At decision block 110, the system determines if the player wishes to adjust the game play characteristics of the puzzle pieces. For example, a player may turn off the ability to position pieces depending upon the distance a mouse click is from the center of mass of a puzzle piece by setting the angular momentum slider to zero or the lowest setting. Alternatively or additionally, all of the physical characteristics as a group may be turned off by a player by setting a global control to zero or its lowest setting. If the player does not wish to adjust the puzzle characteristics (block 112—No), the process continues to block 114. If the player wishes to adjust the puzzle characteristics (block 110—Yes), at block 112 the system receives the desired characteristics and adjust the puzzle responses accordingly.

At block 114, the system calculates the center of mass of the puzzle piece or section of completed pieces that the player wants to move. Then at block 116, the system moves the puzzle piece or pieces appropriately. In one embodiment, if a player clicks on a puzzle piece at or near its center of mass, the player can drag the piece to a new location without affecting the rotational position of the piece. However, the farther away from the center of mass of the piece that the player clicks, the more angular momentum a player may transfer to the piece. Consequently, the farther away from the piece's center of mass that the player clicks on the piece, the less pronounced the circular movement of the player's navigational controls must be in order to induce the same effective angular rotation in a puzzle piece. Thus, adding angular momentum calculations to the puzzle pieces permits a player to move and rotate a selected piece or completed section of the puzzle simultaneously, rather than requiring a player to execute two consecutive moves to obtain the same result.

Further, a puzzle piece may continue to move along the direction indicated by a player through the use of the navigational controls and also continue to rotate in the same direction as an initial spin after the player's navigational input has stopped, based on the angular momentum, inertia, and friction settings. Thus, puzzle pieces may be spun and/or thrown toward a destination on the screen, perhaps near a matching piece. Then, if a player issues a stop command, such as pressing a pre-selected key on the keyboard or a button on the input device, the piece will be frozen at its location and with its orientation at the time the stop command was issued.

In one embodiment, in order to decrease the time it takes a player to manipulate puzzle pieces, or perhaps just for convenience, a player may modulate the effect of moving and rotating navigational gestures by holding down a specific key or a button on the input device. Thus, the player may indicate that the rotation of a selected piece may be arrested at a certain convenient angle while dragging the piece into position. Alternatively, a player may indicate that navigational gestures only rotate the pieces without moving them. These preferences may allow a player to more quickly manipulate the digital puzzle pieces in order to decrease the total time to complete the puzzle. This type of game control could be advantageous in online contests where a player competes to finish a digital puzzle in the least amount of time.

At decision block 118, the system decides if the player has moved a puzzle piece or section of pieces to another matching puzzle piece or section of pieces. A match may be determined in part based on sufficient proximity of the pieces to be matched and sufficient closeness of orientation of the pieces. If the pieces match (block 118—Yes), at block 120 the system couples the pieces together. The new puzzle section that is created is considered a new, larger piece with its own center of mass. Then at decision block 122, the system decides if the puzzle has been completed. If the puzzle is complete (block 122—Yes), the process can continue to process 100E described below.

If the pieces do not match (block 118—No) or if the puzzle is not complete (block 122—No), at decision block 124 the system determines if there is a pause in the game playing. A pause can be initiated by the player through pressing a predetermined pause button. Alternatively, a pause can be defined to occur when the system determines that the game is idle for a preselected period of time, for example one minute. If the system detects a pause (block 124—Yes), at block 126 the system can play a static advertisement or a video advertisement in the puzzle screen. In one embodiment, if the user returns to the game while a video advertisement is playing, and the system senses user input through the gaming controls, the system can resume displaying the puzzle window. The process continues at block 108 when the advertisement has finished playing.

If the system does not detect a pause (block 124—No), the process continues at block 108.

While a player is completing a digital jigsaw puzzle and immediately after the puzzle has been successfully completed, the player's attention is focused upon the puzzle image. Thus, it may be advantageous for advertisers to use digital jigsaw puzzles that use advertising content for the puzzle images. This provides the player with entertainment while at the same time engaging the prospective customer with the subject matter for several minutes as the user assembles the advertisement.

The image chosen by the advertiser may or may not be related to the advertiser's products and/or services. However, a related image may serve the dual purpose of providing a puzzle image while also introducing the player to the advertiser's products and/or services. Upon completion of a puzzle, the player may be directed to click upon the puzzle image to visit the website of the advertiser.

Figure 1B:
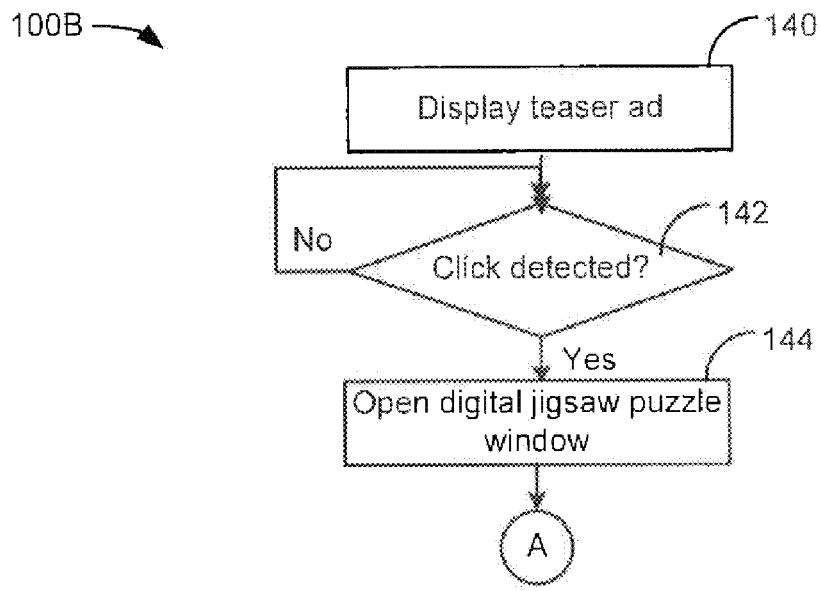
FIG. 1B depicts a flow chart illustrating an example process of displaying a teaser advertisement in conjunction with providing a digital jigsaw puzzle.

Digital jigsaw puzzles can be used as an advertising format encapsulating standard online display advertising. FIG. 1B depicts a flow chart illustrating an example process 100B of displaying a teaser advertisement in conjunction with providing a digital jigsaw puzzle.

At block 140, a teaser advertisement is displayed that invites users to play a digital jigsaw puzzle by clicking on the advertisement. The teaser advertisement may be placed anywhere on the internet. A standard size advertisement, such as 300×250 pixels, or any other standard advertisement sizes, as governed by the Internet Advertising Bureau, may be used for the teaser advertisement. In one embodiment, the teaser advertisement can be a static advertisement. In one embodiment, the teaser advertisement can be a Flash animation that shows a partially completed puzzle image, and the puzzle pieces are animated to show completion of a jigsaw puzzle to users. The Flash animation can be played over and over again in a loop. Along with the animation, the advertisement can display an invitation, for example, 'click to play' or 'complete this puzzle to win a prize'.

At decision block 142, the system determines if a player has clicked on the advertisement. If the system does not detect a click (block 142—No), the process remains at decision block 142 until a click is detected. If the system detects a click (block 142—Yes), at block 144 the system opens a browser window that shows an online jigsaw puzzle game. The window may be a full-sized window or any smaller size. The process can continue at block 101 in process 100A, as described above. Additional advertisements may be shown in the window of the jigsaw puzzle.

Figure 1C:
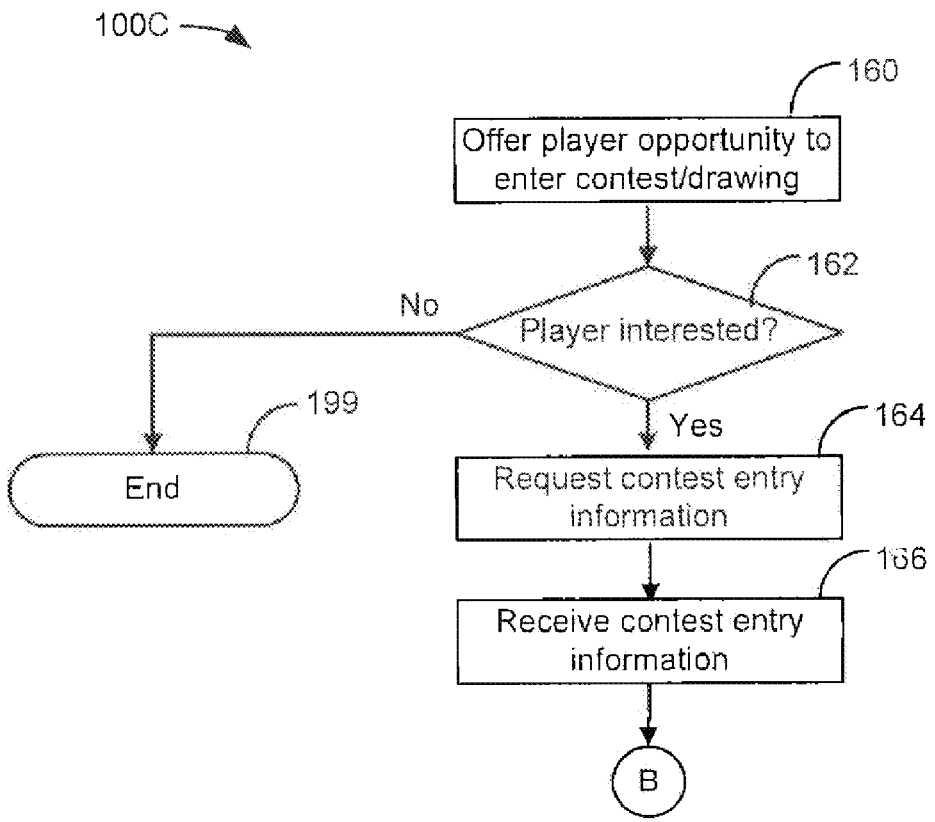
FIG. 1C depicts a flow chart illustrating an example process of offering an online jigsaw puzzle website or widget.

FIG. 1C depicts a flow chart illustrating an example process 100C of using completion of a digital jigsaw puzzle as a contest entry requirement. Similar to a cost-per-action advertisement, at block 160 a player may be offered an opportunity to enter a drawing for a prize or another type of contest upon completion of a digital jigsaw puzzle. At decision block 162, the system determines if the player is interested in entering the contest. If the player is interested in entering the contest (block 162—Yes), at block 164 the system requests contest entry information. The required entry information includes, but is not limited to, an email address, zip code, address, age, and answers to a survey. The survey can also offer the player an opportunity to co-register for other services, newsletters, or sweepstakes. In one embodiment, the survey can include checkboxes that advertise these opportunities.

The system receives the requested information at block 166. The process then continues at block 101 in process 100A, as described above. If the player is not interested in entering the contest (block 162—No), the process ends at block 199.

Figure 1D:
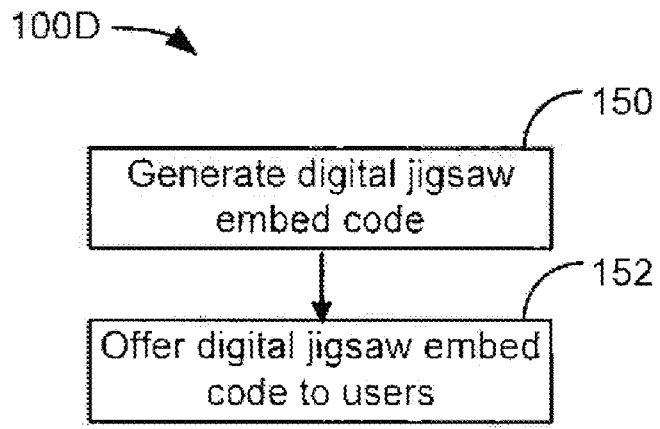
FIG. 1D depicts a flow chart illustrating an example process of using completion of a digital jigsaw puzzle as a contest entry requirement.

FIG. 1D depicts a flow chart illustrating an example process 100D of placing a digital jigsaw puzzle having a particular puzzle image on a website. At block 150, the system generates the embed code for a particular digital jigsaw puzzle. Then at block 152, the system offers the embed code to players either prior to or upon completion of the jigsaw puzzle. The player can used the embed code to place the digital jigsaw puzzle in various online locations including, but not limited to, on the player's blog, on a social networking site profile, or any other web destination that the player controls or is able to place embed codes on. Consequently, a digital jigsaw puzzle may gain widespread popularity virally through sharing over the Internet, such as with email, blogs, and social network sharing websites. The inherent popularity of a virally-spread jigsaw puzzle makes the puzzle an ideal advertising vehicle when used in conjunction with any of the above described integration opportunities.

A website that uses the digital jigsaw puzzle as a marketing technology may offer periodic, such as weekly or monthly, contests or drawings. By offering a different daily puzzle challenge, each completed daily puzzle may earn the player an additional entry into the drawing or contest. Thus, players have an incentive to bookmark the URL for the daily puzzle website and return to complete a new puzzle in order to increase their chances of being selected as a winner. Simultaneously, the website marketer may use the jigsaw puzzles to engage their website visitors with their marketing message, thus enhancing awareness of their products and services while at the same time increasing the affinity of the user with the website which, in turn, boosts the likelihood of that user returning to the website featuring the puzzles.

Figure 1E:
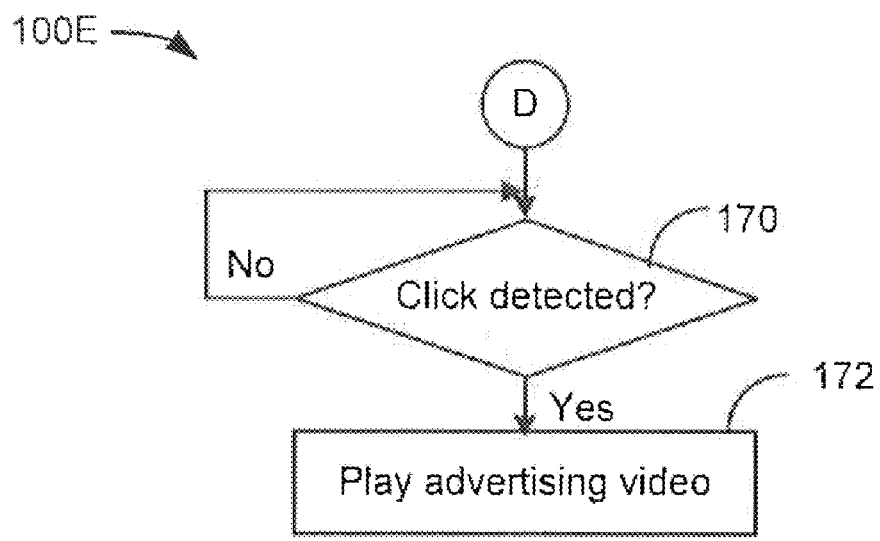
FIG. 1E depicts a flow chart illustrating an example process of playing an advertising video following completion of a digital jigsaw puzzle.

FIG. 1E depicts a flow chart illustrating an example process 100E of playing an advertising video following completion of a digital jigsaw puzzle. After the system determines at decision block 122 in process 100A in FIG. 1A that the jigsaw puzzle is complete, at decision block 170 the system determines if the player has clicked on the puzzle image. If a click is not detected (block 170—No), the system waits at decision block 170 for a click. If a click is detected (block 170—Yes), at block 172 the system plays the advertising video. Alternatively or additionally, the advertising video can automatically start playing a short time after the player completes the puzzle. The completed puzzle image may be the first frame of an online click-to-play video advertisement. When the player clicks on a completed puzzle image, a video advertisement begins playing in the puzzle space. Thus, an online jigsaw puzzle would be able to integrate a high cost-per-thousand impression (CPM) video advertisement. Video formats that may be used include, but are not limited to, Flash, AVI, ASF, Quicktime, Windows Media, or MPEG formats.

Figure 3A:
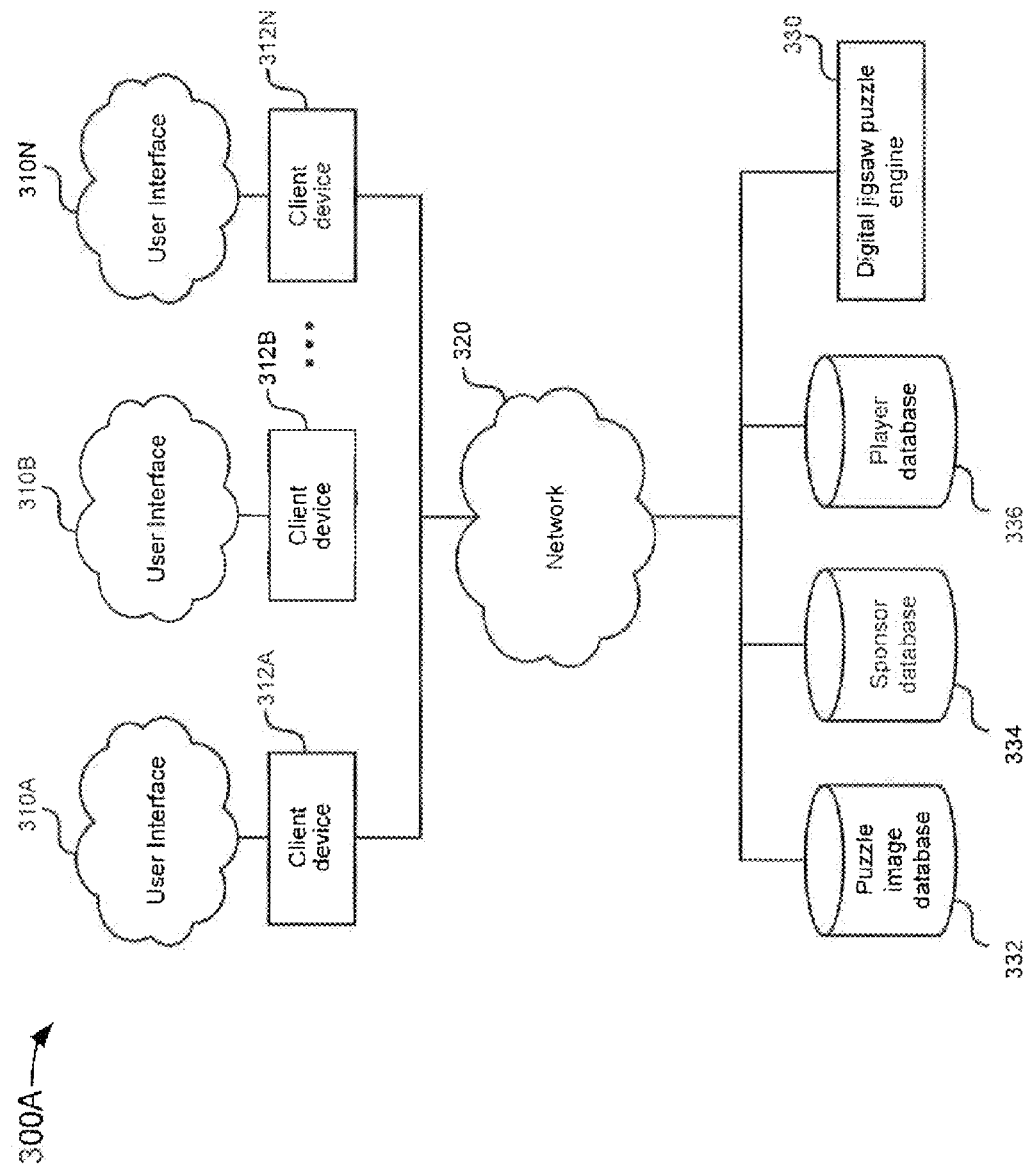
FIG. 3A shows a block diagram of a plurality of client devices, databases, and a digital jigsaw puzzle engine coupled via a network, according to one embodiment.

FIG. 3A shows a block diagram 300A of a plurality of client devices 312A-N, databases 332, 334, 336, and a digital jigsaw puzzle engine 330 coupled via a network 320, according to one embodiment.

The plurality of client devices 312A-N can be any system and/or device, and/or any combination of devices/systems that is able to establish a connection with another device, a server and/or other systems. The client devices 312A-N typically include display 310A-N or other output functionalities to present data exchanged between the devices to a user. For example, the client devices can be, but are not limited to, a server desktop, a desktop computer, a computer cluster, a mobile computing device such as a notebook, a laptop computer, a handheld computer, computer gaming consoles such as Xbox 360® and Nintendo Wii™, ambient consumer electronics such as Chumby, a mobile phone, a smart phone, a PDA, a BlackBerry™ device, and/or an iPhone, etc. In one embodiment, the client devices 312A-N are coupled to a network 320. In some embodiments, the client devices may be directly connected to one another.

The network 320, to which the client devices 312A-N are coupled, may be a telephonic network, an open network, such as the Internet, or a private network, such as an intranet and/or the extranet. The client devices 312A-N can be coupled to the network (e.g., Internet) via a dial-up connection, a digital subscriber loop (DSL, ADSL), cable modem, and/or other types of connection. Thus, the client devices 312A-N can communicate with remote servers (e.g., web server, host server, mail server, instant messaging server) that provide access to user interfaces of the World Wide Web via a web browser, for example.

The puzzle image database 332, sponsor database 334, and player database 336 may store information such as advertising images, videos, software, descriptive data, and/or any other data item utilized by parts of the digital jigsaw puzzle engine 330 for operation. The puzzle image database 332, sponsor database 334, and player database 336 may be managed by a database management system (DBMS), for example but not limited to, Oracle, DB2, Microsoft Access, Microsoft SQL Server, PostgreSQL, MySQL, FileMaker, etc.

In one embodiment, the puzzle image database 332 stores data including, but not limited to, images from advertisers to be used as puzzle images. The database 332 can also store advertisements to be used as teaser advertisements in conjunction with digital jigsaw puzzles.

In one embodiment, the sponsor database 334 stores data including, but not limited to, the sponsor's name, contact information, website link, video advertisements, and contest information.

In one embodiment, the player database 336 stores data including, but not limited to, information related to entering an advertiser's contest associated with completion of a digital jigsaw puzzle, such as name, email address, age, zip code, and responses to survey questions.

The digital jigsaw puzzle engine 330 is, in some embodiments, able to communicate with client devices 312A-N via the network 320. In addition, the digital jigsaw puzzle engine 330 is able to retrieve data from the puzzle image database 332, sponsor database 334, and player database 336 and to provide digital jigsaw puzzles to players via the network 320. In some embodiments, the digital jigsaw puzzle engine 330 is able to integrate various advertising techniques with the digital jigsaw puzzles provided to users of the client devices 312A-N via the network 320.

Figure 3B:
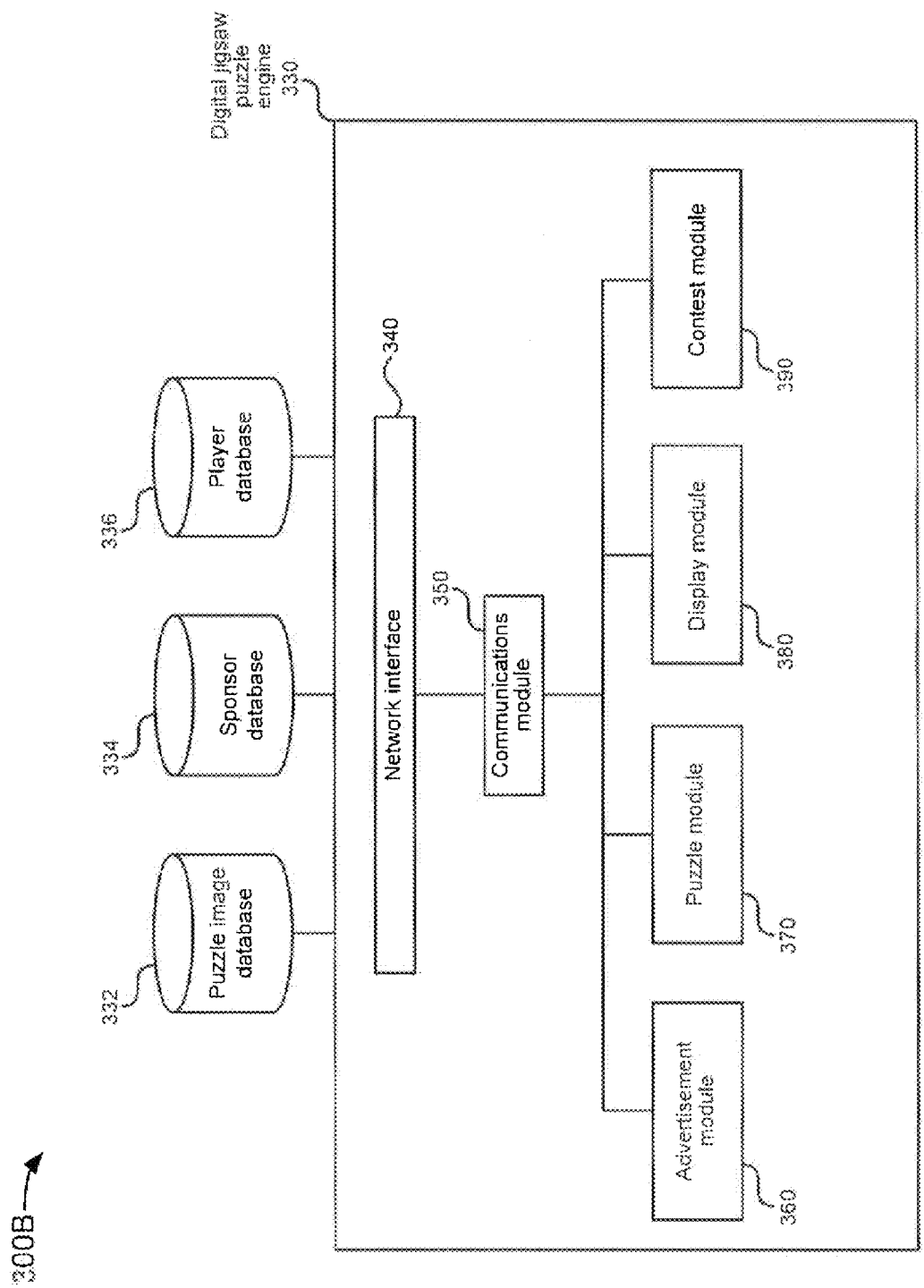
FIG. 3B depicts a block diagram illustrating an example system for providing digital jigsaw puzzles, the system to include a digital jigsaw puzzle engine coupled to a puzzle image database, and/or a sponsor database, and/or a player database, according to one embodiment.

FIG. 3B depicts a block diagram illustrating an example system 300B for providing digital jigsaw puzzles, the system to include a digital jigsaw puzzle engine 330 coupled to a puzzle image database 332, a sponsor database 334, and a player database 336, according to one embodiment.

In the example of FIG. 3B, the digital jigsaw puzzle engine 330 includes a network interface 340, a communications module 350, an advertisement module 360, a puzzle module 370, a display module 380, and a contest module 390. The puzzle image database 332, sponsor database 334, and player database 336 may be communicatively coupled to the digital jigsaw puzzle engine 330 as illustrated in FIG. 3B. In some embodiments, the puzzle image database 332, the sponsor database 334, and/or the player database 336 are partially or wholly internal to the digital jigsaw puzzle engine 330.

In the example of FIG. 3B, the network interface 340 can be one or more networking devices that enable the digital jigsaw puzzle engine 330 to mediate data in a network with an entity that is external to the engine 330, through any known and/or convenient communications protocol supported by the engine 330 and the external entity. The network interface 340 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

In the example of FIG. 3B, the digital jigsaw puzzle engine 330 includes the communications module 350 or a combination of communications modules communicatively coupled to the network interface 340 to manage a one-way, two-way, and/or multi-way communication sessions over a plurality of communications protocols. In one embodiment, the communications module 350 transmits and receives data (e.g., textual data, video files, etc.), information, commands, and/or requests over a network. In one embodiment, the communications module 350 receives communications from a network (e.g., Internet, wired and/or wireless network) initiated via a web-interface.

The communications module 350 can manage log-on requests received from advertisers connecting to the digital jigsaw puzzle engine 330 to submit advertisements and/or contest entry information and from players connecting to the engine 330 to play a digital jigsaw puzzle and/or enter a contest in conjunction with a digital jigsaw puzzle. In some instances, authenticated sessions are managed by the communications module 350 for user logon processes. For example, the platform may utilize a username/email and password identification method for authorizing access. The communications module 350 can gather data to determine if the user is authorized to access the system and if so, securely logs the user into the system.

One embodiment of the digital jigsaw puzzle engine 330 includes an advertisement module 360. The advertisement module 360 may be any combination of software agents and/or hardware components able to request and receive images and/or videos from advertisers or sponsors. The images can be used as digital jigsaw puzzle images. Alternatively, a first frame of an advertising video can be used as a digital jigsaw puzzle image, and the rest of the video can be shown after the player has completed the puzzle.

In some embodiments, the advertising images can be used as teaser advertisements to encourage a player to click on the advertisement in order to open a digital jigsaw puzzle game window.

In some instances, the advertisement module 360 can generate embed code to place a digital jigsaw puzzle as a widget on a website. The embed code can be provided to players through the communications module 350 during a game or after completion of a puzzle.

One embodiment of the digital jigsaw puzzle engine 330 includes a puzzle module 370. The puzzle module 370 may be any combination of software agents and/or hardware components able to divide an image into puzzle pieces, scatter the pieces with random orientations to start a puzzle game, and calculate a center of mass and other game-play characteristics of an individual puzzle piece or a group of completed puzzle pieces, such as inertia, friction and angular momentum. In some embodiments, the puzzle module 370 may have controls that allow a player to adjust the degree to which the puzzle pieces exhibit the game-play characteristics. For example, the controls can include slider or knob controls and/or numerical settings. In some instances, a player can turn the game-play characteristics off.

The puzzle module 370 accepts inputs from a player through the communications module 350. The inputs can be from a variety of game navigational controls including, but not limited to, a computer mouse, keyboard, track pad, touch screen, gaming controller or any other computer, mobile phone, handheld gaming, or game console input device. The player uses the input controls to select and manipulate an individual puzzle piece or a section of completed pieces by clicking on a location of the desired piece and then manipulating the game controls. The puzzle module 370 calculates the distance of the indicated location on the piece from the center of mass of the piece. This information is then used in conjunction with the player's manipulation inputs and calculations of angular momentum, friction, and inertia to calculate a trajectory for the puzzle piece.

One embodiment of the digital jigsaw puzzle engine 330 includes a display module 380. The display module 380 may be any combination of software agents and/or hardware components able to display a digital jigsaw puzzle, the movements of the puzzle pieces by a player, and a pointer for the player to indicate the piece or pieces to be moved.

The display module 380 accepts inputs from a player through the communications module 350. The display module 380 uses the inputs to determine where to move the player's pointer. Additionally, the display module 380 uses the calculated trajectory information for puzzle pieces from the puzzle module 370 to indicate the result of a player's game control inputs.

In some embodiments, the display module 380 also plays advertising video provided by a sponsor in conjunction with completion of certain digital jigsaw puzzles.

In some embodiments, the display module 380 displays the puzzle pieces such that they mimic the appearance of real jigsaw puzzle pieces having a finite thickness.

One embodiment of the digital jigsaw puzzle engine 330 includes a contest module 390. The contest module 390 may be any combination of software agents and/or hardware components able to request and receive information from a sponsor about a contest or a drawing to be offered. The information can include, but is not limited to, the prize being offered, the number of times a player can enter the contest by completing a digital jigsaw puzzle, and information required to be submitted by a player to be eligible to enter the contest, such as name, email address, zip code, age, and any other survey questions.

In some embodiments, the contest module 390 can present the contest information to a digital jigsaw puzzle player prior to the start of game. The player may be required to enter the requested information before being allowed to play the game. Alternatively, the player may be presented the contest information after the player has finished the puzzle.

In one embodiment, the contest module 390 can offer a periodic (e.g. daily or weekly) puzzle challenge on a website. Each new puzzle has a different puzzle image that may include new advertising information from a sponsor.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. A method of advertising using a digital jigsaw puzzle comprising:
   using a teaser advertisement on a webpage that invites a player to complete the digital jigsaw puzzle;
   opening a window with the digital jigsaw puzzle when the teaser advertisement is clicked;
   dividing an image containing an advertising message into a plurality of pieces;
   displaying the pieces scattered with random orientations in a puzzle window;
   receiving input from a player to shift and rotate the pieces in the puzzle window to assemble the image; and
   displaying movement of the pieces responsive to the player's input,
   wherein the pieces exhibit physical characteristics comprising center of mass, angular momentum, friction, and inertia; the pieces mimic an appearance of real puzzle pieces with bevels and shadows; the player can shift and rotate the pieces simultaneously; and the player is offered a chance to enter a contest for completing the digital jigsaw puzzle.

2. The method of claim 1, wherein shifting the pieces includes moving the pieces left, right, up, down, diagonally, or in any direction.

3. The method of claim 1, wherein rotating the pieces includes rotating the pieces clockwise or counterclockwise.

4. The method of claim 1, wherein the pieces may be shifted and rotated simultaneously.

5. The method of claim 1, further comprising requesting the player to click on the image after completion of the digital jigsaw puzzle, wherein the image provides a link to an advertiser's website.

6. The method of claim 1, wherein the image of a completed puzzle is a first frame of a video advertisement that begins to play after the player completes the digital jigsaw puzzle.

7. The method of claim 1, further comprising requesting the player to click on an advertisement prior to completion of the puzzle.

8. The method of claim 1, further comprising requiring the player to submit information prior to offering the player the opportunity to enter the prize drawing.

9. The method of claim 8, further comprising offering the player an opportunity to sign up for other services, newsletter, or sweepstakes.

10. A method of advertising using a digital jigsaw puzzle comprising:
    using a teaser advertisement on a webpage that invites a player to complete the digital jigsaw puzzle;
    opening a window with the digital jigsaw puzzle when the teaser advertisement is clicked;
    dividing an image containing an advertising message into a plurality of pieces;
    displaying the pieces scattered with random orientations in a puzzle window;
    receiving input from a player to shift and rotate the pieces in the puzzle window to assemble the image; and
    displaying movement of the pieces responsive to the player's input.

11. A method of advertising using a digital jigsaw puzzle comprising:
    offering a periodic digital jigsaw puzzle challenge online;

creating a puzzle window for the periodic digital jigsaw puzzle;
dividing an image containing an advertising message into a plurality of pieces;
displaying the pieces scattered with random orientations in the puzzle window;
receiving input from a player to shift and rotate the pieces in the puzzle window to assemble the image;
displaying advertising near the puzzle window;
displaying movement of the pieces responsive to the player's input,
wherein the pieces exhibit physical characteristics comprising center of mass, angular momentum, friction, and inertia; the pieces mimic an appearance of real puzzle pieces with bevels and shadows; the player can shift and rotate the pieces simultaneously; and the player is offered a chance to enter a contest for completing the digital jigsaw puzzle; and
granting the player a chance to win a prize for each completed digital jigsaw puzzle.

12. A method of advertising using a digital jigsaw puzzle comprising:
offering embed code within one or more websites that allows users to put the digital jigsaw puzzle as a widget on one or more websites, wherein the widget:
divides an image into a plurality of pieces;
displays the pieces scattered with random orientations in a game area,
receives input from a player to shift and rotate the pieces in the game area to assemble the image, and
displays movement of the pieces responsive to the player's input,
wherein the pieces exhibit physical characteristics comprising center of mass, angular momentum, friction, and inertia; the pieces mimic an appearance of real puzzle pieces with bevels and shadows; the player can shift and rotate the pieces simultaneously; and the player is offered a chance to enter a contest for completing the digital jigsaw puzzle; and
displaying advertising within the jigsaw puzzle widget.

13. A digital jigsaw puzzle system, comprising:
a puzzle image database configured to store puzzle images;
a puzzle module configured to:
divide a puzzle image containing an advertising message into a plurality of pieces;
display the pieces scattered with random orientations in a puzzle window;
receive input from a player to shift and rotate the pieces in the puzzle window to assemble the image;
display movement of the pieces responsive to the player's input, wherein the pieces exhibit physical characteristics comprising center of mass, angular momentum, friction, and inertia;
a communications module configured to receive input from a player to shift and rotate the pieces, wherein the player can shift and rotate the pieces simultaneously; and
a display module configured to display the digital jigsaw puzzle and movements of the pieces, wherein the pieces exhibit physical characteristics comprising center of mass, angular momentum, friction, and inertia; the pieces mimic an appearance of real puzzle pieces with bevels and shadows; and the player is offered a chance to enter a contest for completing the digital jigsaw puzzle.

14. The digital jigsaw puzzle system of claim 13, further comprising an advertisement module configured to play an advertising video upon completion of the digital jigsaw puzzle, wherein the puzzle image is a first frame of the advertising video.

15. The digital jigsaw puzzle system of claim 13, further comprising a contest module configured to offer a player a chance to enter a contest upon completion of the digital jigsaw puzzle.

16. A method for providing a digital jigsaw puzzle, the method comprising:
receiving from an advertising party, by a game server, an advertisement that the advertising party wishes to place in the form of a jigsaw puzzle by the game server;
identifying, by the game server, an image representative of the advertisement to placed in the form of the jigsaw puzzle;
accepting, by the game server, the identified image as an input for generating a jigsaw puzzle;
dividing, by the game server, the identified image into a plurality of pieces;
displaying, by the game server, the pieces scattered with random orientations in a game area associated with an end user, the end user being a recipient of the advertisement;
receiving, by the game server, input from a player to shift and rotate the pieces in the game area to assemble the image;
displaying, by the game server, movement of the pieces responsive to the player's input, wherein the pieces exhibit physical characteristics comprising center of mass, angular momentum, friction, and inertia; the pieces mimic an appearance of real puzzle pieces with bevels and shadows; the player can shift and rotate the pieces simultaneously;
upon completion of the jigsaw puzzle by the end user, displaying, by the game server, a resulting representation of the identified image, the resulting representation serving as the advertisement the advertising party wishes to place.

17. The method of claim 16, further comprising:
receiving from the advertising party a teaser related to the advertisement;
placing, by the game server, the teaser in an online forum accessible to the end user, wherein the teaser includes at least a portion of the advertisement and presents an invitation to the end user to select the teaser to participate in a jig saw puzzle contest to be able to obtain further details relating to the advertisement;
upon the end user selecting the teaser, proceeding with identifying the representative image and generating the jigsaw puzzle for use by the end user.

* * * * *